Nov. 12, 1963    A. F. STANDING    3,110,822
PULSE GENERATOR
Original Filed Feb. 16, 1959

WITNESSES
Edwin E. Bassler
James F. Young

INVENTOR
Arthur F. Standing
BY D. W. Cleary
ATTORNEY

United States Patent Office 3,110,822
Patented Nov. 12, 1963

3,110,822
PULSE GENERATOR
Arthur F. Standing, Loveland, Ohio, assignor to Westinghouse Electric Corporation, East Pittsburgh, Pa., a corporation of Pennsylvania
Continuation of application Ser. No. 793,436, Feb. 16, 1959. This application Aug. 17, 1960, Ser. No. 50,186
5 Claims. (Cl. 307—106)

This invention relates to a pulse modulator for a radar transmitter. More particularly, this invention relates to a current adjustment device for a sin$^2$ pulse modulator.

An object of the invention is to provide an accurate current regulator in limiting devices to a sin$^2$ pulse moderator.

Another object of the invention is to provide an accurate current regulator for a sin$^2$ pulse modulator having two series type charging circuits.

Still another object of the invention is to provide a current limiting device for a sin$^2$ pulse modulator to regulate the current passing through the gas discharge of the modulator during the discharge of the capacitors of the modulator.

A further object of the invention is the provision of a device to adjust current in the wave forming circuit of a sin$^2$ pulse modulator so that the output wave form of the pulse modulator can be accurately determined.

A still further object of the invention is to provide a current adjusting device in a sin$^2$ pulse modulator that can operate to adjust the output wave forms and also limit the current going through the gas discharge tube of the pulse modulator during the discharge or pulse forming period of operation.

A still further object of the invention is to provide an accurate current regulating device for a sin$^2$ pulse modulator that is small in size yet operates to limit the current passing through the gas discharge tube of the sin$^2$ pulse modulator.

This application is a continuation of application Serial No. 793,436, filed February 16, 1959, entitled "Pulse Generator" by Arthur F. Standing.

Other objects and advantages of the present invention will become more apparent to those skilled in the art from the following detailed description when taken in connection with the accompanying drawing, wherein.

Figure 1:
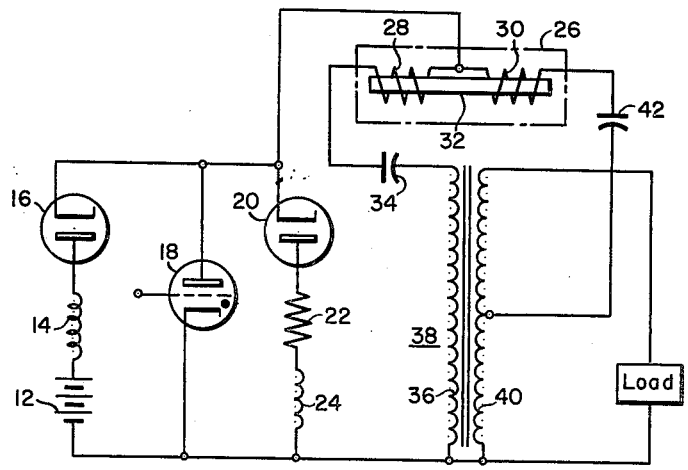
FIGURE 1 is a circuit diagram showing the sin$^2$ pulse modulator with the current regulating device shown in dotted lines.

Referring to the drawing, FIG. 1 illustrates a sin$^2$ pulse modulator which is similar to the modulator disclosed in detail in patent application No. 724,394, filed March 27, 1958, by Arthur F. Standing and Coleman J. Miller, and now Patent No. 2,990,481. A similar modulator is also shown and described in application Serial No. 760,752, filed September 12, 1958, An Over Voltage Protection Device, and now abandoned. Briefly, this modulator comprises a D.C. voltage supply 12 which is connected in series with a choke or coil 14, a unidirectional charging diode 16, and a thyratron tube 18. Connected across the thyratron tube 18 is a bypass diode 20, a current limiting resistor 22, and an inductor 24. The cathode of bypass diode 20 is connected to a current regulating means shown in dotted lines and illustrated by numeral 26. More specifically, the cathode of diode 20 is connected to two coils or windings 28 and 30 which are mounted on a dielectric bar 32 and are mounted for longitudinal movement thereon to vary the distance d therebetween. The coils 28 and 30 are oppositely wound so that when current passes therethrough a positive mutual inductance will be present in each of these coils. By varying the distance d between the coils therefore the amount of inductance presented by these coils can be varied. The coil 28 is connected through a charging capacitor 34 to the primary 36 of an output transformer 38. The lower terminal of the primary 36, as shown in the drawing, is in turn connected to the inductor 24. The coil 30 is connected through a charging capacitor 42 to the secondary 40 of output transformer 38. The secondary 40 of output transformer 38 is connected across the load as shown.

The operation of this pulse forming circuit will not be described in detail, since the above-mentioned cases clearly set forth the operation which enables this circuit to produce a sin$^2$ pulse by the use of two exponentially decaying discharging circuits which contribute to form the desired pulse. As described in the above two cases, these two decaying currents are rendered 180° out of phase by passing them through the primary and secondary respectively of the output transformer 38.

The discharging of these two circuits is initiated by applying a pulse to the thyratron tube 18 so as to render this tube conductive and thereby provide a discharge path for the two charging circuits. It has been found however, that the initial current during the discharge period is quite high and is excessive for many makes of thyratron tubes. Additionally, this excessive current will affect the other elements in the discharge circuit so as to result in high voltages in the discharge circuit and possibly damage the components in the circuit. Further, adjustment and balance of these two discharging circuits is needed to produce an accurately shaped sin$^2$ wave form.

Figure 2:
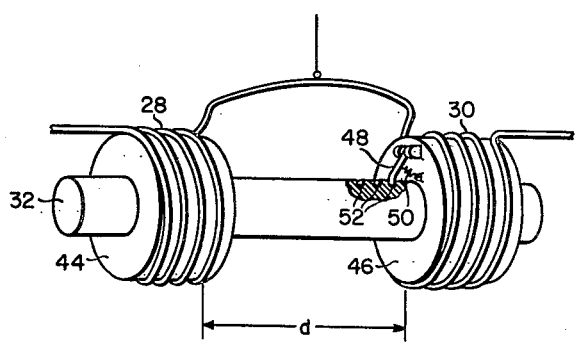
FIGURE 2 is an enlarged view of the regulating device shown in dotted lines in FIGURE 1.

FIG. 2 illustrates the current regulating device 26 in more detail. The coils 28 and 30 are mounted on two discs 44 and 46. These discs are in turn mounted on the rod 32. The distance d between the discs 44 and 46 is varied and as can be understood, many methods can be employed to vary the distance between discs 44 and 46. As shown, however, the disc 44 is fixedly mounted on rod 32, while the disc 46 is slidably mounted on rod 32 for longitudinal movement thereon so as to vary the distance d between the two discs 44 and 46. By varying this distance, the mutual inductance affected thereby is varied so that the output wave form can be accurately calibrated or adjusted. Further, this added inductance in the form of a mutual inductance between the two coils 28 and 30 will limit or regulate the current passing through the thyratron tube 18 during the discharge period so as to protect the thyratron tube and all the components in the discharge circuit. As shown, the disc 46 has a pivotally mounted dog or ratchet 48 which is spring pressed inwardly by a spring 50 that is secured to the disc 46. The dog 48 is pivotally mounted and is rotatable into recesses 52 in the bar 32 so as to lock the disc 46 in place in its proper position. As can be understood, this adjustment could be made by employing a threaded rod and internally threaded discs for varying the distance between disc 46 and disc 44.

In the operation of the device illustrated, the two coils 28 and 30 are oppositely wound on the bar 32 so as to provide a positive mutual inductance between these bars. As a result, the total inductance presented to the thyratron tube 18 is far greater than if the coils were positioned without a coupling therebetween. As a result, the current passing through the thyratron tube 18 is accurately limited to protect the thyratron tube and the size of the two coils 28 and 30 can be made relatively small. Further, since these coils are inductively coupled and therefore adjacent to each other, the modulator can be made compact yet limit the current through thyratron tube 18. Hence, it is seen that the coils 28 and 30 operate effectively to protect the thyratron tube 18 from the excessive current and additionally these two coils can be adjusted so as to change the shape of the output wave form by changing the mutual inductance therebetween. This is accomplished as shown in FIG. 2 by moving disc 46 to a desired distance $d$ from the disc 44. By so varying the distance $d$, the positive mutual inductance in the discharging circuit is varied so that the output wave forms can be accurately calibrated. That is to say, an accurately shaped $\sin^2$ wave form can be obtained by adjusting the distance $d$ between the discs 44 and 46.

Thus, it is seen that by employing an adjustable mutual inductance in the discharging circuit of the modulator, the current through the thyratron tube 18 is regulated and the same device is adjustable to accurately produce a $\sin^2$ wave form. Additionally, this protective device for the thyratron tube 18 is accomplished without adding any electrical component which would add weight to the device and increase its size.

As will be understood, the invention is not limited to the specific examples shown in the drawing. As pointed out, the adjustment of the distance between the coils may be accomplished many other ways. These and other variations, as well as the substitution of equivalent elements or those shown may be made in accordance with the broader scope or spirit of the invention.

I claim as my invention:

1. A pulse generator comprising a plurality of charging circuits, each of said charging circuits including an inductor member, a capacitor and a unidirectional diode device, a switching device operatively connected to said charging circuits to provide a discharge path for said capacitors, and two of said inductor members being inductively coupled so as to provide a mutual inductance therebetween.

2. A pulse generator comprising a pair of charging circuits, said charging circuits including an inductor member and a capacitor, a voltage source connected in series with said charging circuits for charging said capacitors, a switching device operatively connected to said circuits to discharge said capacitors when said discharge device is rendered conductive, and said inductor members inductively coupled so as to provide a positive mutual inductance in said circuits.

3. A pulse generator comprising a charging circuit including an inductor member and a capacitor connected in series, another charging circuit including another inductor member and another capacitor member connected in series, a voltage source for charging said charging circuit and said other charging circuit, a gaseous discharge device, a transformer having primary and secondary windings, a discharge path for said charging circuit including said charging circuit, said primary winding and said gaseous discharge device, another discharge circuit for said other charging circuit including said charging circuit, said secondary winding and said gaseous discharge device, said inductor member and said other inductor member inductively coupled to provide a positive mutual inductance therebetween, and means for varying said mutual inductance.

4. A pulse generator comprising a plurality of charging circuits, each of said charging circuits including an inductance means and capacitance means, means for charging said charging circuits, means for providing a discharge path for said circuits exclusive of said charging means and two of said inductance means being inductively coupled to provide a positive mutual inductance therebetween.

5. A pulse generator comprising a pair of charging circuits, each of said charging circuits including an inductor member and a capacitor, means for charging said charging circuits, means for providing a discharge path for said circuits, said inductor members being positioned to provide positive mutual inductance therebetween, and said inductor members being mounted for relative movement to vary the mutual inductance therebetween.

References Cited in the file of this patent
UNITED STATES PATENTS
2,773,199      Scoles _____ Dec. 4, 1956